United States Patent
Misawa et al.

(10) Patent No.: US 8,094,201 B2
(45) Date of Patent: Jan. 10, 2012

(54) PICTURE DELIVERY REMOTE CONTROL APPARATUS, PICTURE DELIVERY SYSTEM AND PICTURE DELIVERY METHOD

(75) Inventors: Takeshi Misawa, Asaka (JP); Sumie Mikami, Asaka (JP); Atsushi Misawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 718 days.

(21) Appl. No.: 11/723,916

(22) Filed: Mar. 22, 2007

(65) Prior Publication Data

US 2007/0263084 A1 Nov. 15, 2007

(30) Foreign Application Priority Data

Mar. 24, 2006 (JP) .................. 2006-084032

(51) Int. Cl.
*H04N 5/232* (2006.01)
(52) U.S. Cl. ................................. 348/211.11
(58) Field of Classification Search .............. 348/211.11
See application file for complete search history.

(56) References Cited

U.S. PATENT DOCUMENTS

| | | | |
|---|---|---|---|
| 6,933,956 B2 * | 8/2005 | Sato et al. ................ | 345/690 |
| 6,965,399 B1 * | 11/2005 | Oka et al. ................ | 348/211.99 |
| 7,149,549 B1 * | 12/2006 | Ortiz et al. ............... | 348/211.2 |
| 7,379,664 B2 * | 5/2008 | Marcus ..................... | 396/56 |
| 2008/0297615 A1 * | 12/2008 | Kagawa et al. ........... | 348/222.1 |

FOREIGN PATENT DOCUMENTS

| | | |
|---|---|---|
| JP | 2002-247045 A | 8/2002 |
| JP | 2003-284047 | 10/2003 |
| JP | 2003-323440 A | 11/2003 |
| JP | 2003-330953 A | 11/2003 |
| JP | 2004-194012 A | 7/2004 |
| JP | 2005-51778 | 2/2005 |

OTHER PUBLICATIONS

Japanese Office Action, Notice of Reasons for Rejection; Aug. 12, 2010.
Koji Yamamoto et al., An "Opt-Navi" System Using a Custom CMOS Image Sensor with a Function of Reading Multiple Region-of-interests, The Journal of the institute of Image Information and Television Engineers, vol. 59, No. 12, pp. 1830-1840, Dec. 2005.

* cited by examiner

*Primary Examiner* — Tuan Ho
*Assistant Examiner* — Jason Flohre
(74) *Attorney, Agent, or Firm* — Birch, Stewart, Kolasch & Birch, LLP

(57) ABSTRACT

An object of the present invention is to make it possible to receive delivery of pictures from desired picture delivery equipment as necessary, and select and enjoy a desired picture from the pictures obtained at various positions. As a result, according to a picture delivery remote control apparatus of the present invention, it is possible to select a desired piece of picture delivery equipment from which delivery of a picture is to be requested, by selecting information specific to the piece of picture delivery equipment displayed on the first display section and request the desired piece of picture delivery equipment to deliver a picture, in an instinctive and understandable way, and thereby it is possible to easily enjoy pictures delivered from various positions.

49 Claims, 11 Drawing Sheets

PICTURE DELIVERY REMOTE CONTROL APPARATUS, PICTURE DELIVERY SYSTEM AND PICTURE DELIVERY METHOD

BACKGROUND OF THE INVENTION

1. Field of the Invention

The present invention relates to a technique for acquiring information specific to equipment by an image pickup element and performing remote control of desired equipment based on the acquired information specific to the equipment. In particular, the present invention relates to a technique for performing remote control of picture delivery equipment such as a TV camera.

2. Description of the Related Art

There has been a technique for acquiring position information from a taken scenery image and acquiring information related to the position. Japanese Patent Applications Laid-Open No. 2003-330953, No. 2003-323440 and No. 2002-247045 relate to such a technique.

Recently, various techniques for instinctively understandably controlling desired equipment with a single controller have been developed. For example, according to "Proposal of 'OPTO-NAVI' System, which is an information-appliance multi-purpose remote controller using a low power consumption ID-receiving CMOS image sensor having a function of reading a partial area at a high speed" (The Journal of the Institute of Image Information and Television Engineers Vol. 59, No. 12, pp. 1830-1840 (2005)) (hereinafter referred as "non-patent document"), a custom image sensor mounted on a mobile phone is used to receive an ID from equipment while a normal image is taken in real time. The received ID is displayed being superimposed on the taken background image. The user can perform an operation while visually confirming the target equipment and the ID on the display.

SUMMARY OF THE INVENTION

None of Japanese Patent Applications Laid-Open No. 2003-330953, No. 2003-323440 and No. 2002-247045 and the non-patent document discloses a concrete device for easily obtaining a desired picture from pictures taken at various positions. The present invention has been made in consideration of such a problem, and its object is to make it possible to receive delivery of pictures from desired picture delivery equipment as necessary, and select and enjoy a desired picture from the pictures obtained at various positions.

A picture delivery remote control apparatus according to the present invention is provided with: an acquisition section which continuously acquires an image of a picture delivery equipment to be remotely controlled as a subject and information specific to the picture delivery equipment optically transmitted from the picture delivery equipment, with an image pickup element; a first display section which superposes the image continuously acquired by the acquisition section and the information specific to the picture delivery equipment to display the superposed image; an instruction acceptance section which accepts, from a user, selection of information specific to a desired piece of picture delivery equipment to deliver a picture among the image delivery equipment the information specific to which has been acquired and a picture delivery request to the piece of picture delivery equipment the information specific to which has been selected; and a remote control section which transmits the picture delivery request to the piece of picture delivery equipment the information specific to which has been selected via the instruction acceptance section.

According to the invention, it is possible to select a desired piece of picture delivery equipment from which delivery of a picture is to be requested, by selecting information specific to the piece of picture delivery equipment displayed on the first display section and request the desired piece of picture delivery equipment to deliver a picture, in an instinctive and understandable way, and thereby it is possible to easily enjoy pictures delivered from various positions.

The instruction acceptance section may accept an instruction related to control of the picture delivery equipment, and the remote control section may transmit a remote control signal corresponding to the content of the control instructed by the instruction acceptance section to the piece of picture delivery equipment the information specific to which has been selected via the instruction acceptance section.

The instruction acceptance section may accept designation of any picture delivery destination, and the remote control section may transmit, to the piece of picture delivery equipment the information specific to which has been selected via the instruction acceptance section, a request to deliver a picture from the piece of picture delivery equipment to the picture delivery destination accepted by the instruction acceptance section.

As described above, it is also possible to deliver a picture to any delivery destination.

The first display section can display information specific to such picture delivery equipment as almost captures the acquisition section in the image-taking range.

Thereby, such picture delivery equipment as takes an image of the user of the picture delivery remote control apparatus himself can be selected in an instinctive and understandable way.

Specifically, by causing the transmission range of information specific to picture delivery equipment to be almost corresponding to the image-taking range of the picture delivery equipment, information specific to such picture delivery equipment as almost captures the acquisition section in the image-taking range can be displayed.

The picture delivery remote control apparatus may further comprise: a receiving section which receives a picture delivered from the piece of picture delivery equipment in response to the picture delivery request; and a second display section which displays the picture received by the receiving section. However, the picture delivery remote control apparatus itself is not required to display a delivered picture at all. A delivered picture may be displayed on the designated delivery destination described above.

The first display section and the second display section may be configured by the same display device.

A picture delivery system according to the present invention is provided with: a picture delivery equipment which optically transmits specific information; an acquisition section which continuously acquires an image of a picture delivery equipment as a subject and specific information optically originated from the picture delivery equipment, with an image pickup element; a first display section which superposes the images continuously acquired by the acquisition section and the information specific to the picture delivery equipment to display the superposed image; an instruction acceptance section which accepts, from a user, selection of information specific to a desired piece of picture delivery equipment to deliver a picture among the image delivery equipment the information specific to which has been acquired and a picture delivery request to the piece of picture delivery equipment the information specific to which has been selected; a remote control section which transmits the picture delivery request to the piece of picture delivery equipment the information specific to which has been selected via the instruction acceptance section; a receiving section which receives a picture delivered from the piece of picture delivery equipment in response to the picture delivery request; and a second display section which displays the picture received by the receiving section.

A picture delivery method according to the present invention includes the steps of: continuously acquiring images in which picture delivery equipment targeted by remote control is captured as a subject and information specific to the picture delivery equipment optically transmitted from the picture delivery equipment, with an image pickup element; superposing the continuously acquired image and the information specific to the picture delivery equipment and displaying the superposed image; accepting, from a user, selection of information specific to a desired piece of picture delivery equipment to deliver a picture among the image delivery equipment the information specific to which has been acquired and a picture delivery request to the piece of picture delivery equipment the information specific to which has been selected; transmitting, to the piece of picture delivery equipment the information specific to which has been selected, the request to deliver a picture from the piece of picture delivery equipment; receiving a picture delivered from the piece of picture delivery equipment in response to the picture delivery request; and displaying the received picture.

According to this invention, it is possible to select a desired piece of picture delivery equipment from which delivery of a picture is to be requested, by selecting information specific to the piece of picture delivery equipment displayed on the first display section and request the desired piece of picture delivery equipment to deliver a picture, in an instinctive and understandable way, and thereby it is possible to easily enjoy pictures delivered from various positions.

DETAILED DESCRIPTION OF THE PREFERRED EMBODIMENTS

Figure 1:
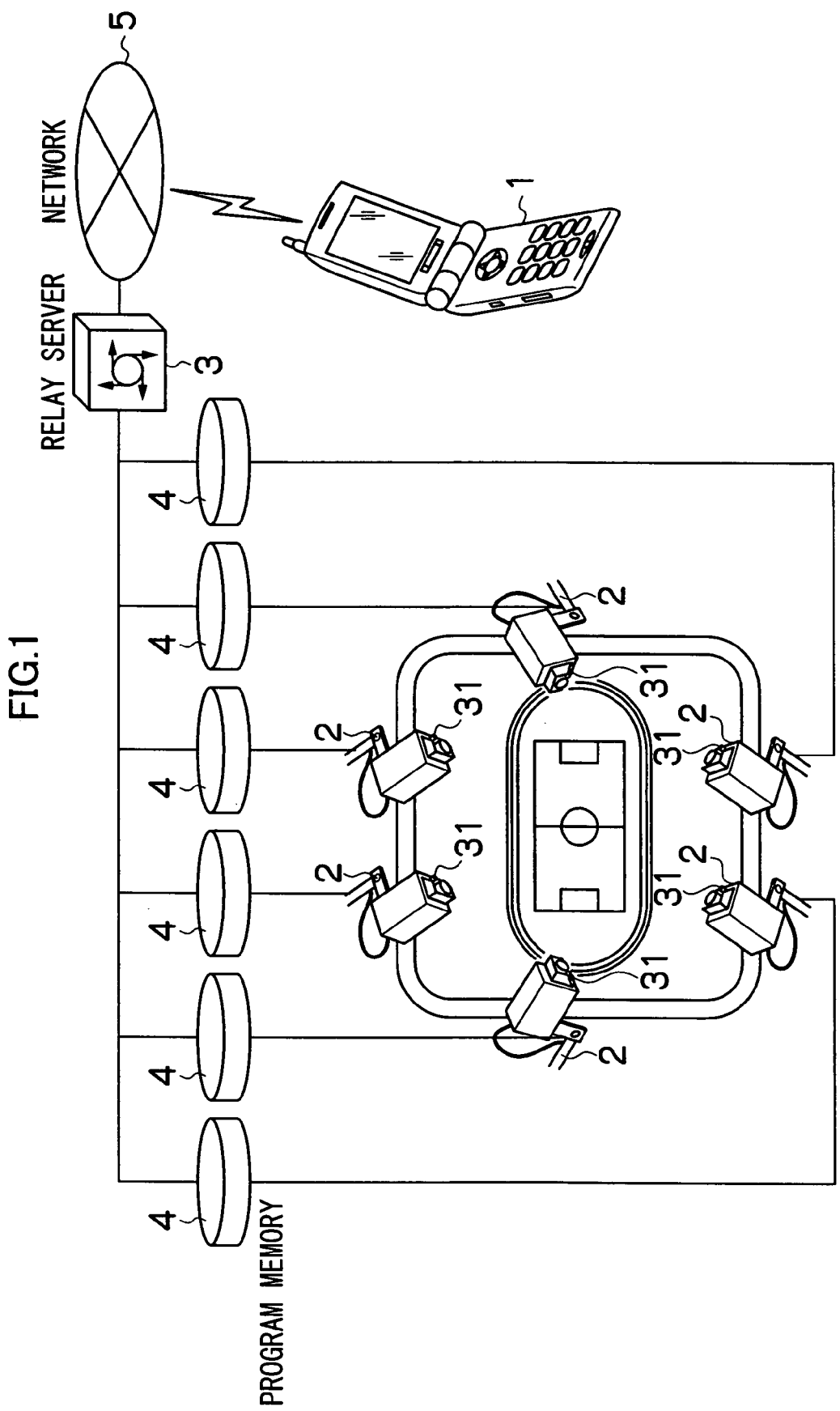
FIG. 1 is a schematic configuration diagram of a remote control system according to a first embodiment.

FIG. 1 is a schematic configuration diagram of a remote control system according to a first embodiment of the present invention. This system includes a remote control apparatus 1 and multiple TV cameras 2 controlled by the remote control apparatus 1. The remote control apparatus 1 is connected to a relay server 3 via a network 5 such as a mobile communication network, the Internet and an intranet.

Each of the TV cameras 2 is connected to the relay server 3, and the relay server 3 connects any one of the TV cameras 2 to the remote control apparatus 1 in accordance with control by the remote control apparatus 1. Then, the relay server 3 relays a picture signal from the TV camera 2 so that it is transmitted to the remote control apparatus 1 or relays a remote control signal from the remote control apparatus 1 so that it is transmitted to the TV camera 2.

However, if the remote control apparatus 1 can be directly connected to a desired camera 2, the relay server 3 is not required.

Each of the TV cameras 2 takes an image of a different image-taking range of a certain place, for example, a predetermined area of an athletic field or a race course. In addition to performing various image-taking operations such as start of image-taking, stop of image-taking, zooming in, zooming out, panning, tilting and position movement in response to a remote control signal received from the remote control apparatus 1 via the network 5, the camera 2 performs various picture delivery operations such as start and termination of delivery of a picture signal acquired by the image-taking operations.

The camera 2 is provided with an information origination section 31. When the information origination section 31 is in a state of enabling remote control of operations (for example, in a state that the main power source is on), it overlaps a low-frequency pilot signal informing its information origination position with equipment-specific information which is information specific to itself (any information specific to the camera 2 is possible, such as an identification number, ID, serial number, manufacturer number, type number, model, and address on an external network) and continuously originates it by an optical signal such as an infrared ray signal. If the information origination section 31 is configured by an indicator or a tally lamp which is originally provided for the camera 2, common people do not feel unfamiliar with the appearance. Furthermore, since provision of a new origination section is not necessary, the cost can be advantageously reduced.

A picture signal of each camera 2 is stored in a program memory 4 corresponding to each of the camera S2 for a predetermined period of time. The program memory 4 specified by the remote control apparatus 1 delivers the stored picture signal to the remote control apparatus 1 in response to a picture delivery request received from the remote control apparatus 1 via the network. Thereby, picture signals which the camera 2 has obtained during a predetermined period of time in the past can be delivered to the remote control apparatus 1. The program memory 4 may be included in the camera 2 or the relay server 3.

Figure 2:
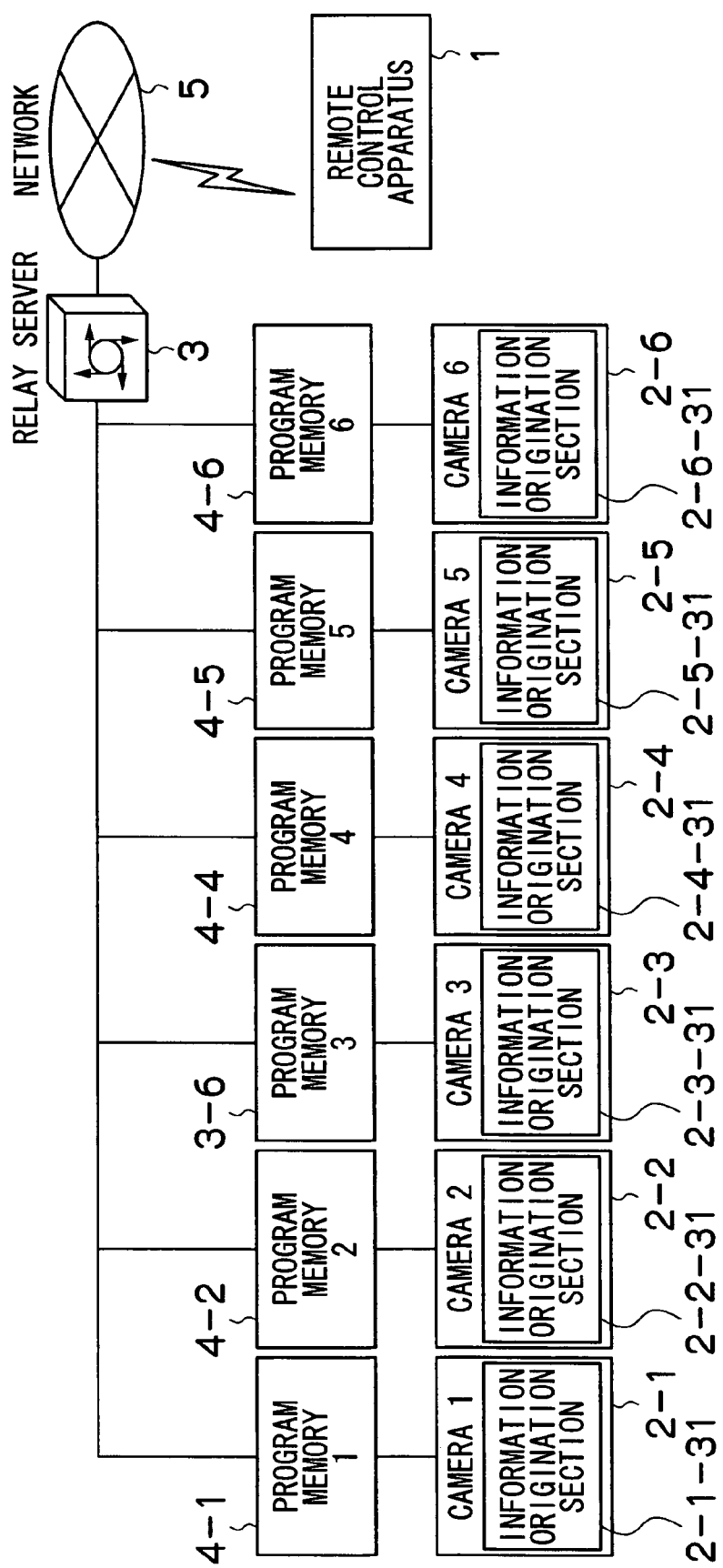
FIG. 2 is a block configuration diagram of the remote control system according to the first embodiment.

FIG. 2 is a block diagram of this system. Cameras 2-1 to 2-6 are provided with information origination sections 2-1-31 to 2-6-31 which originate different equipment-specific information, respectively.

Though only one remote control apparatus 1 is shown in this figure, the relay server 3 can individually respond to a picture delivery request to a desired camera 2 transmitted from each of multiple remote control apparatuses 1. As for picture delivery requests from different remote control apparatuses 1 to the same camera 2, the same picture signal can be sent from the same camera 2 to each of the remote control apparatuses 1. However, in the case where remote controls related to an image-taking operation of the same camera 2 conflict with each other, it is recommended to perform exclusive control, such as execution of only the content of control by the remote control apparatus 1 which has connected earlier.

Figure 3:
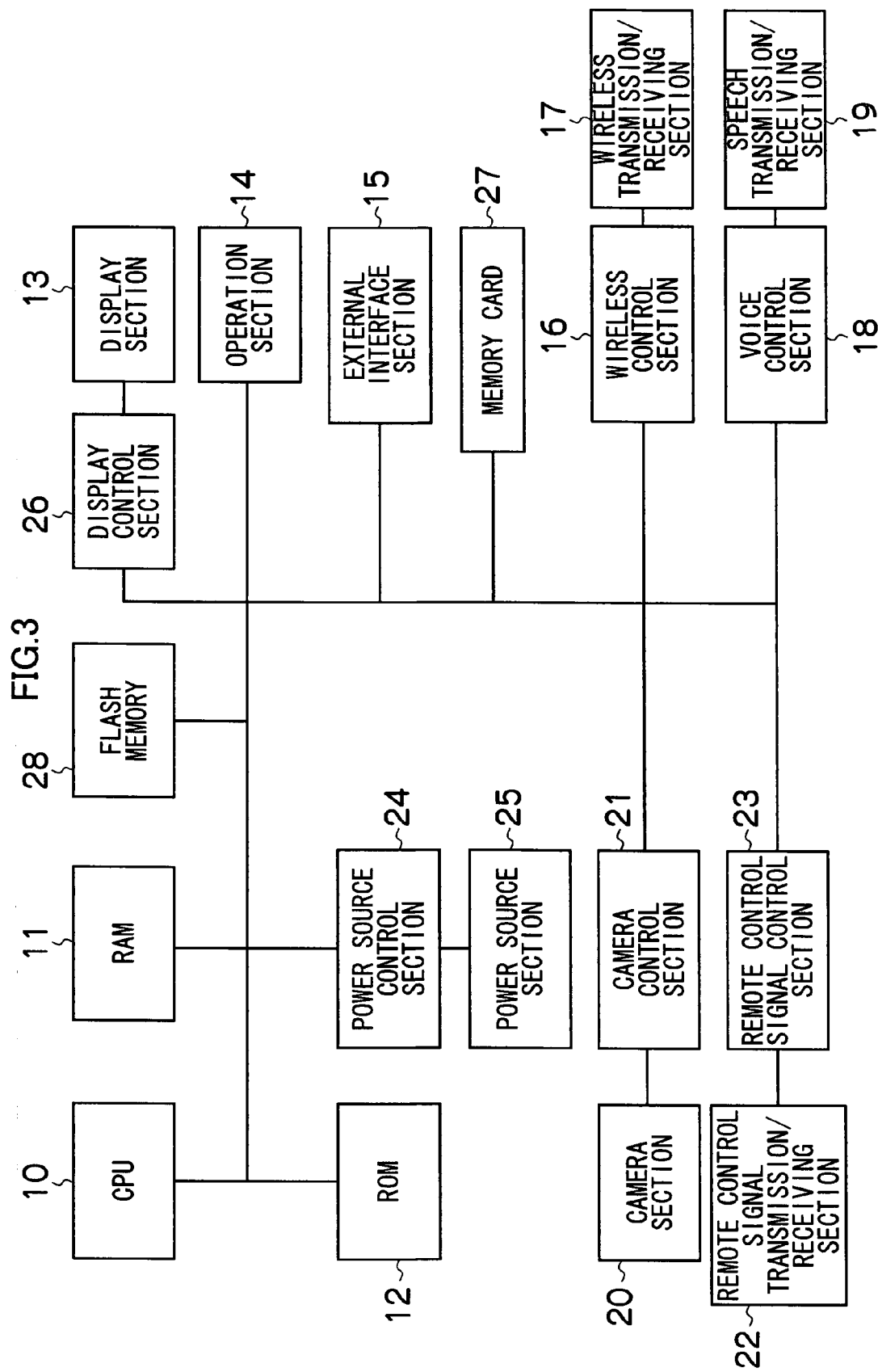
FIG. 3 is a configuration diagram of a remote control apparatus.

FIG. 3 is a functional block diagram of the remote control apparatus 1. The remote control apparatus 1 includes a camera section 20 which includes an image-taking lens, an image pickup element such as a CMOS/CCD image sensor, an analog front-end circuit for performing processing of an analog image read from the image pickup element by a driver to a digital signal, a signal processing circuit such as a DSP (Digital Signal Processor) for processing the digital image signal from the analog front-end circuit, and the like; and a camera control section 21 which is configured by a one-chip microcomputer or the like and which controls the image-taking operation of the camera section 20.

The remote control apparatus 1 is also provided with a display control section 26 which performs display control of a display section 13 in accordance with an operation of input to an operation section 14 configured by a ten-key pad or a cross key, various operation signals received from the outside by a remote control signal transmission/receiving section 22, an image or equipment-specific information acquired by the camera section 20, and the like.

The remote control apparatus 1 is also provided with a CPU 10 for controlling the operation of each section, a ROM 12 for storing various data and programs and a RAM 11 for storing various data required for processing by the CPU 10.

Especially in the ROM 12, there are stored, for each of the multiple cameras 2, a control program for the CPU 10 to control a remote control signal control section 23 or a wireless control section 16 so that a remote control signal with which a control code of the camera 2 in accordance with an operation of the operation section 14 is overlapped is originated, and remote control GUI for visually displaying the relation between the operation of each section of the operation section 14 and a control code to be overlapped in response to the operation.

For example, an optical double zoom lens is used as the image-taking lens, and the optical zoom magnification is changed by a motor driver forward and backward driving the image-taking lens to the telephotographic (tele) side or the wide-angle (wide) side in accordance with a magnification change operation inputted from the operation section 14. The magnification of the image-taking lens is not limited to the above. An aperture is provided for the image-taking lens. An appropriate amount of exposure is obtained by controlling the aperture via the motor driver.

When the photographing mode is set by the operation section 14, the CPU 10 displays a motion picture (live images) on the display section 13 to enable confirmation of the image-taking angle of field. That is, the image pickup element converts a light of a subject which is incident through the image-taking lens and is formed on the light-receiving surface of the image pickup element to an amount of signal charge corresponding to the amount of the light. The signal charges of respective pixels accumulated in this way are sequentially and individually read by the driver as voltage signals (image signals) corresponding to the signal charges, based on a driving pulse given by a timing generator in accordance with a direction from the CPU 10 and converted to digital signals in the analog front-end circuit, and each of them is added to the signal processing circuit.

The signal processing circuit includes a gain adjustment circuit and an A/D converter. It is an image processing device which includes a brightness/color difference signal generation circuit, a gamma correction circuit, a sharpness correction circuit, a contrast correction circuit, a white balance correction circuit, an outline processing section for performing imaging processing including outline correction for a taken image, a noise reduction processing section for performing noise reduction processing of an image and the like, and it processes an image signal in accordance with a command from the CPU 10.

The image data inputted into the signal processing circuit is converted to a brightness signal (Y signal) and a color difference signal (Cr/Cb signal), and the signals are stored in the VRAM after predetermined processings such as gamma correction is performed therefor.

When the monitor output of a taken image to the display section 13 is performed, a Y/C signal is read from the VRAM and sent to a display control section 26. The display control section 26 converts the inputted Y/C signal to a signal of a predetermined method for display (for example, a compound color picture signal of an NTSC method) and outputs it to the display section 13.

The Y/C signals of respective frames which have been processed at a predetermined frame rate are written in an A area and a B area of the VRAM alternatively, and a written Y/C signal is read not from the area in which a Y/C signal is being written but from the other area, between the A and B areas. By the Y/C signals in the VRAM being periodically overwritten, and picture signals generated from the Y/C signals being provided for the display section 13, the picture being taken is displayed on the display section 13 in real time. The user can confirm the image-taking angle of field by the picture (live images) displayed on the display section 13.

Here, when a photographing key provided on the operation section 14 is pressed, a photographing operation for storage is started. Image data acquired in response to the pressing of the photographing key is converted to a brightness/color difference signal (Y/C signal) in the signal processing circuit, and it is stored in the RAM 11 after predetermined processings such as gamma correction are performed therefor.

The Y/C signal stored in the RAM 11 is compressed in accordance with a predetermined format by a compression/expansion processing circuit and then stored in a memory card 27 as an image file in a predetermined format such as an Exif file. The image file can also be stored in a flash memory 28.

When the reproduction mode is set by the operation section 14, the compressed data of the final image file stored in the flash memory 28 (a file stored last) is read. When the file stored last is a still image file, the read compressed image data is expanded to an uncompressed Y/C signal via the compression/expansion processing circuit and stored in the VRAM. The Y/C signal stored in the VRAM is added to the display control section 26. The display control section 26 creates a compound RGB color picture signal of the NTSC method from the inputted Y/C signal and outputs it to the display section 13. Thereby, the frame image of the last frame stored in the memory card 27 is displayed on the display section 13.

After that, when the right key of a cross key provided on the operation section 14 is pressed, frame advancing is performed in the forward direction, and when the left key of the cross key is pressed, frame returning is performed in the opposite direction. Then, an image file at the frame position set by the frame advancing or returning is read from the memory card 27, and a frame image is reproduced on the display section 13 similarly as described above. If frame advancing is performed in the forward direction when the frame image of the last frame is displayed, the image file of the first frame stored in the memory card 27 is read, and the frame image of the first frame is reproduced on the display section 13.

The number of pixels of an image file to be stored is, for example, any of 2832×2128 (6 M), 2048×1536 (3 M), 1280× 960 (1 M) and 640×480 (VGA), and the amount of data of a taken image (the file size) changes according to the combination of the stored image quality and the number of stored pixels.

The remote control apparatus 1 can be configured, for example, by a camera-equipped mobile phone or a digital camera as shown in the above-identified non patent document. However, a block related to recording/storage of an image (a memory card 27 or a flash memory 28) is not necessarily required in this embodiment.

The remote control signal transmission/receiving section 22 is provided with a light-receiving element. Though the camera section 20 and the remote control signal transmission/receiving section 22 are shown as different components in FIG. 3, the light-receiving element is actually identical to the image pickup element of the camera section 20. Therefore, when the camera section 20 takes an image of the cameras 2 as a subject, it can acquire equipment-specific information and detailed information optically originated by each camera 2 together with the image.

The remote control signal control section 23 converts the equipment-specific information overlapped with an optical signal which has entered the remote control signal transmission/receiving section 22 from the external camera 2 to digital data and outputs it to the CPU 10.

In accordance with the equipment-specific information inputted from the remote control signal control section 23, the CPU 10 reads a table in which control codes specific to the cameras 2 identified by the equipment-specific information is specified, from the ROM 12 to the RAM 11. Then, in accordance with an operation of specifying desired equipment-specific information on the display section 13 from the operation section 14, the control code of the camera 2 identified by the specified equipment-specific information is read from the RAM 11 and sent to the remote control signal control section 23.

The remote control signal transmission/receiving section 22 is provided with an optical signal origination device configured by a light emitting diode or an infrared ray LED. The remote control signal control section 23 originates an optical signal with which a control code and other data specified by the CPU 10 are overlapped, to the specified camera 2. In this way, it is possible to remotely operate a specified camera 2 by transmitting an optical control signal to the camera 2 from the remote control apparatus 1.

The remote control apparatus 1 is also provided with a wireless transmission/receiving section 17 which transmits and receives wireless signals, such as mobile communication wave, IrDA, Bluetooth, WirelessLAN, WirelessUSB and WiMAX signals, to and from the cameras 2, the wireless control section 16 which converts a received wireless signal to data and transmits it to the CPU 10, or overlaps a remote control signal specified by the CPU 10 with a wireless signal, and an external interface section 15 which performs communication with the cameras 2 and other equipment via the network 5 in accordance with TCP/IP or other standards.

The CPU 10 also can read a control code for a particular camera 2 based on an operation of the operation section 14 from the RAM 11 and send it to the wireless control section 16. The wireless control section 16 originates a wireless signal with which the control code and other data inputted by the CPU 10 are overlapped, to the camera 2. This wireless signal reaches the camera 2 via a LAN or an external network. When receiving the control code, the camera 2 performs an operation corresponding to the control code. In this way, it is possible to remotely operate a particular camera 2 with an operation section 14 by sending a wireless signal to the camera 2 from the remote control apparatus 1. In the case of a facility filled with a lot of spectators, such as a stadium, it is conceivable that a lot of operators attempt to perform an operation at the same time. However, control can be adjusted by the cameras 2 or a relay server not shown. For example, it is conceivable to give preference to control by a user who has sent a control code earlier but limit the effective time to 30 seconds.

The remote control apparatus 1 is provided with a speech transmission/receiving section 19 including a voice amplification device which emits voice, such as a speaker, and a speech receiving device which receives voice and converts it to an electrical signal, such as a microphone, and a voice control section 18 for controlling the content of speech from the voice amplification device. The voice control section 18 has a function of recognizing a particular voice pattern specified by the CPU 10, from a voice signal inputted from the speech transmission/receiving section 19.

The CPU 10 can also read a control code for a particular camera 2 corresponding to voice received by the speech transmission/receiving section 19, from the RAM 11, and send it to the remote control signal control section 23 or the wireless control section 16. That is, specification of a control code to be originated by an optical signal, a wireless signal or a wired signal to a particular camera 2 is not limited to an operation of input to the operation section 14 but can be performed by input of voice.

The CPU 10 selects which of the external interface section 15, the remote control signal transmission/receiving section 22 and the wireless transmission/receiving section 17 a control code should be originated from, based on an operation of input to the operation section 14 or voice to the speech transmission/receiving section 19. If the remote control apparatus 1 faces a target camera 2 to be controlled, a control code can be optically originated from the remote control signal transmission/receiving section 22. Otherwise, the user instructs the CPU 10 to originate the control code from the external interface section 15 or the wireless transmission/receiving section 17, by an operation of input to the operation section 14 or voice to the speech transmission/receiving section 19. In response to this instruction, the CPU 10 performs control so that the control code is originated from the external interface section 15 or the wireless transmission/receiving section 17.

Figure 4:
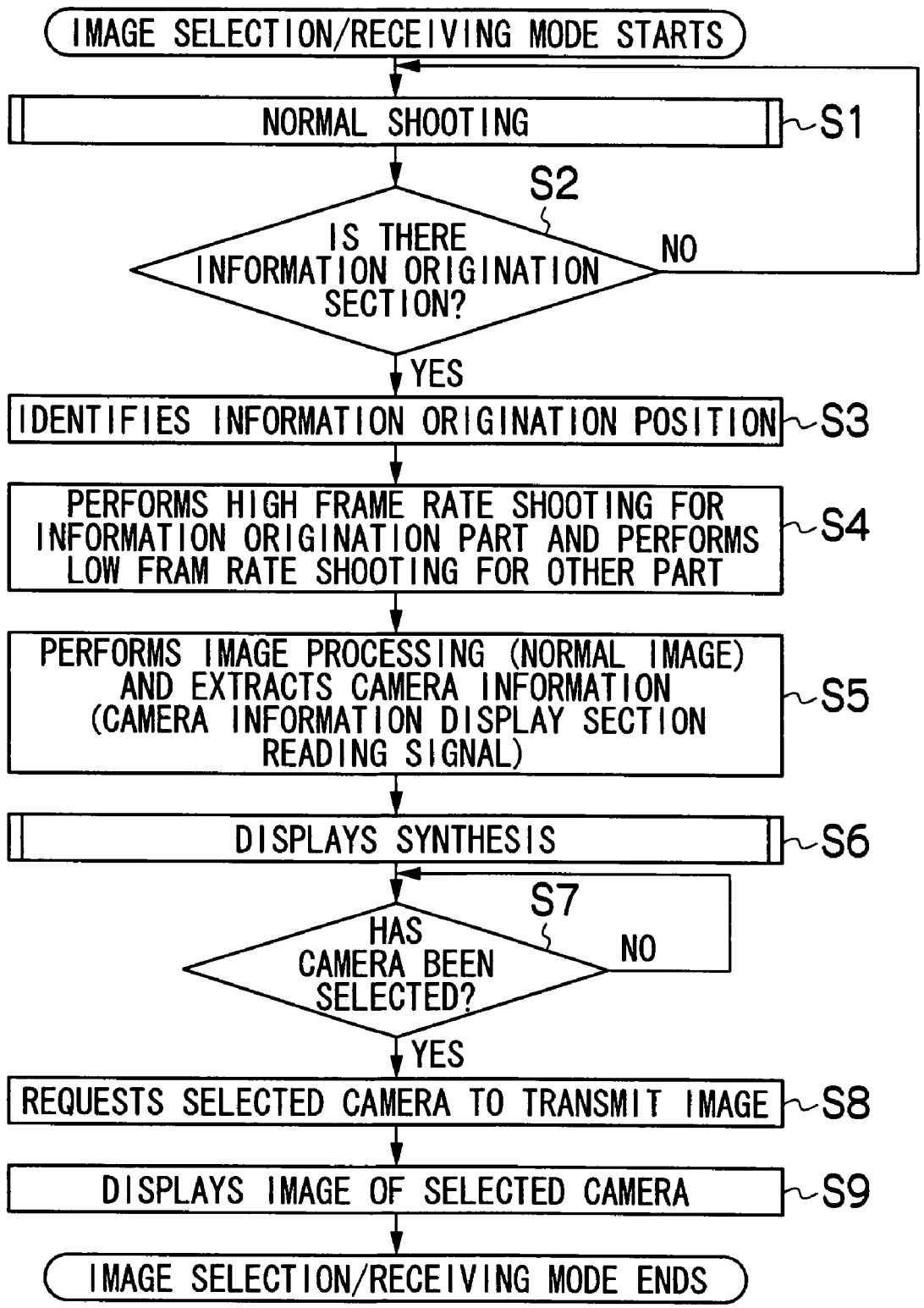
FIG. 4 is a flowchart showing the flow of image selection/receiving mode processing.

FIG. 4 is a flowchart showing the flow of image selection/receiving mode processing to be executed by the remote control apparatus 1.

First, at step S1, the CPU 10 directs the camera control section 21 to start a still image acquisition operation in response to an image-taking instruction inputted to the operation section 14 or the speech transmission/receiving section 19. The camera control section 21 controls the camera section 20 to acquire a still image and stores it in the RAM 11.

At step S2, the CPU 10 determines whether or not a pilot signal from at least one camera 2 has been detected from the image acquired by the camera section 20. If it is determined that at least one pilot signal has been detected, then the flow proceeds to step S3. If it is determined that no pilot signal has been detected, then the flow returns to step S1.

At step S3, the CPU 10 identifies the information origination position based on the position where the pilot signal has been detected.

At step S4, the CPU 10 again performs the still image acquisition operation at a high frame rate for the part of the information origination position and a low frame rate for the other parts.

At step S5, various processings of the image data by the signal processing circuit are performed. At the same time, the CPU 10 extracts equipment-specific information overlapped with the part of the information origination position.

At step S6, the CPU 10 synthesizes the acquired still image and the extracted equipment-specific information and displays the synthesis. If the equipment-specific information is synthesized near the pilot signal detection position, the relation between the subject image of each camera 2 and the equipment-specific information originated by the camera 2 in the still image can be visually understandable. If an icon indicating the camera 2 is displayed together with the equipment-specific information, it is instinctively and easily understood that the equipment-specific information is synthesized.

At step S7, in accordance with an operation of specifying any of the equipment-specific information on the display section 13 by the operation section 14 (an operation of double-clicking or touching a displayed part of the equipment-specific information on the display section 13), the CPU 10 selects a desired camera 2 corresponding to the specified equipment-specific information. Since the equipment-specific information on the display section 13 is specified, it is instinctively and easily understood which camera 2 is selected.

At step S8, the CPU 10 transmits a request to cause a picture to be delivered from the selected camera 2, to the relay server 3. Based on this request, the relay server 3 connects the remote control apparatus 1, the selected camera 2 and a program memory 4 corresponding to the camera 2. The selected camera 2 or the program memory 4 corresponding to the camera 2 transmits a picture signal to the remote control apparatus 1 in response to this request. If the remote control apparatus 1 can be directly connected to the selected camera 2, the picture delivery request can be directly transmitted from the remote control apparatus 1 to the camera 2.

At step S9, the picture received from the camera 2 or the program memory 4 is outputted to the display section 13. Thereby, the picture taken by the desired camera 2 is displayed on the display section 13.

Figure 5:
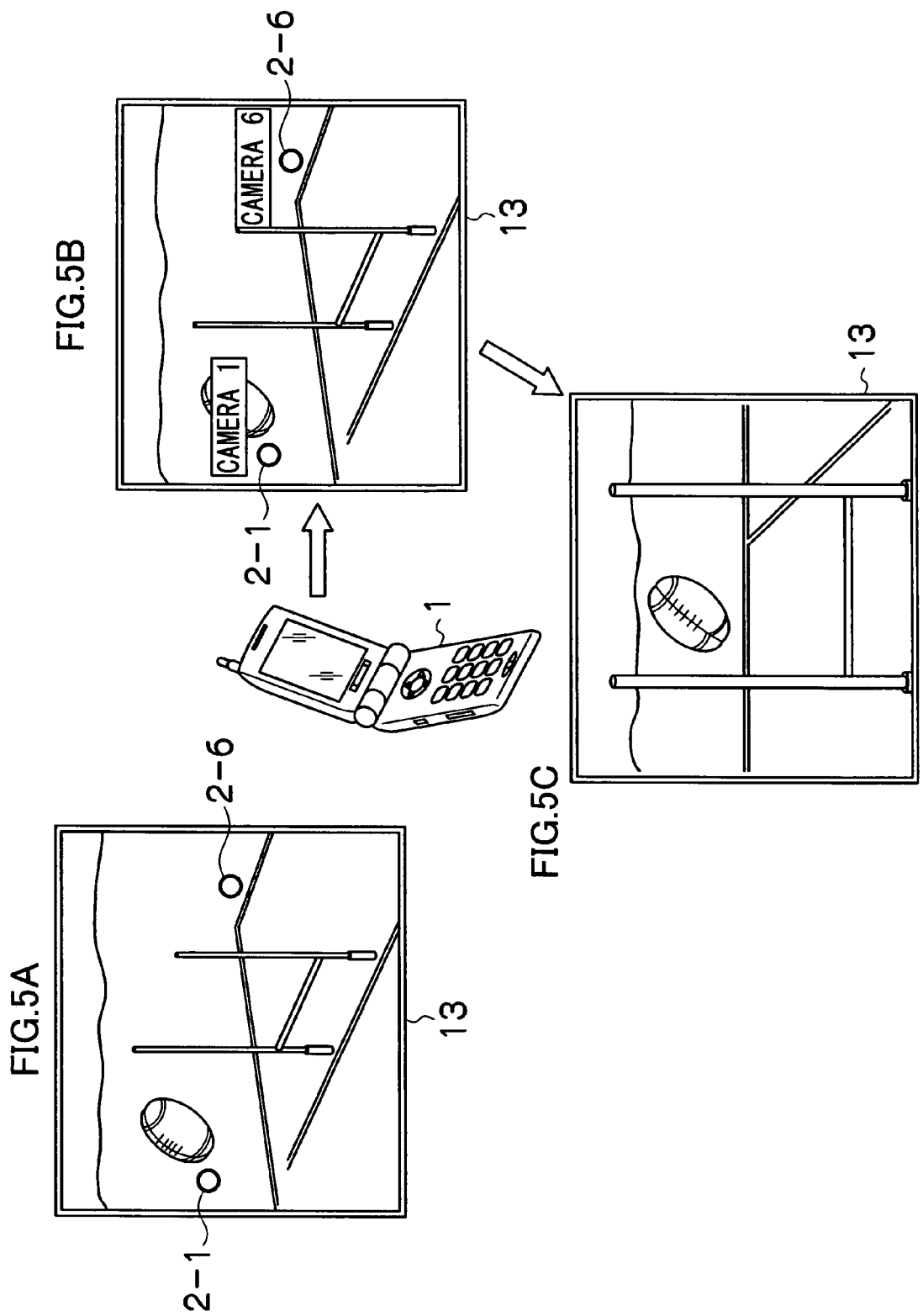
FIGS. 5A, 5B and 5C are diagrams showing that a picture taken by a desired camera selected from the remote control apparatus is displayed on a display section.

FIGS. 5A, 5B and 5C show that a picture taken by a desired camera 2 selected from the remote control apparatus 1 is displayed on the display section 13.

First, as shown in FIG. 5A, it is assumed that a still image acquired by the remote control apparatus 1 captures a condition that a ball is passing a goalpost, from the right side of the goalpost.

Here, as shown in FIG. 5B, it is assumed that the remote control apparatus 1 could extract the equipment-specific information about the camera 2-1 for shooting the left side of the goalpost and the camera 2-6 for shooting the front of the goalpost, from the still image. If the user wants to watch the picture of the ball passing the goalpost in detail from the front, he selects the equipment-specific information about the camera 2-6 for shooting the front of the goalpost. Then, in response to the picture delivery request to the camera 2-6 via the relay server 3, a picture signal is delivered from the camera 2-6 to the remote control apparatus 1.

Then, as shown in FIG. 5C, a picture taken from the front of the goalpost is displayed on the display section 13. The user can watch the picture of the ball passing the goalpost from the front. Thus, the user can arbitrarily select a picture taken by a camera 2 located at a position where he wants to view a scene, depending on the scene, and thereby he can enjoy a realistic picture he desires.

Furthermore, since it is possible to transmit remote control signals specifying various control content, such as zooming, panning and tilting for the camera 2 which is selected by the remote control apparatus 1, the user of the remote control apparatus 1 can set the position and angle of a selected camera 2 and enjoy a picture he desires. In this case, zooming may be performed not by optical zooming in which a zoom lens is actually used but by electronic zooming in which a part of an image is enlarged by electronic image processing.

In the case of a facility filled with a lot of spectators, such as a stadium, control is adjusted by the cameras 2 or a relay server in case of a lot of operators performing an operation at the same time. For example, it is conceivable to give preference to control by a user who has sent a control code earlier but limit the effective time to 30 seconds.

By selecting a program memory 4, a picture taken in the past by a corresponding camera 2 can be obtained. Therefore, the user does not necessarily have to busily select a camera 2 depending on a scene currently captured by each camera 2.

Second Embodiment

It is also possible to enable the camera 2 of the first embodiment to shoot the user of the remote control apparatus 1 himself who is within the shooting range of the camera 2.

Figure 6:
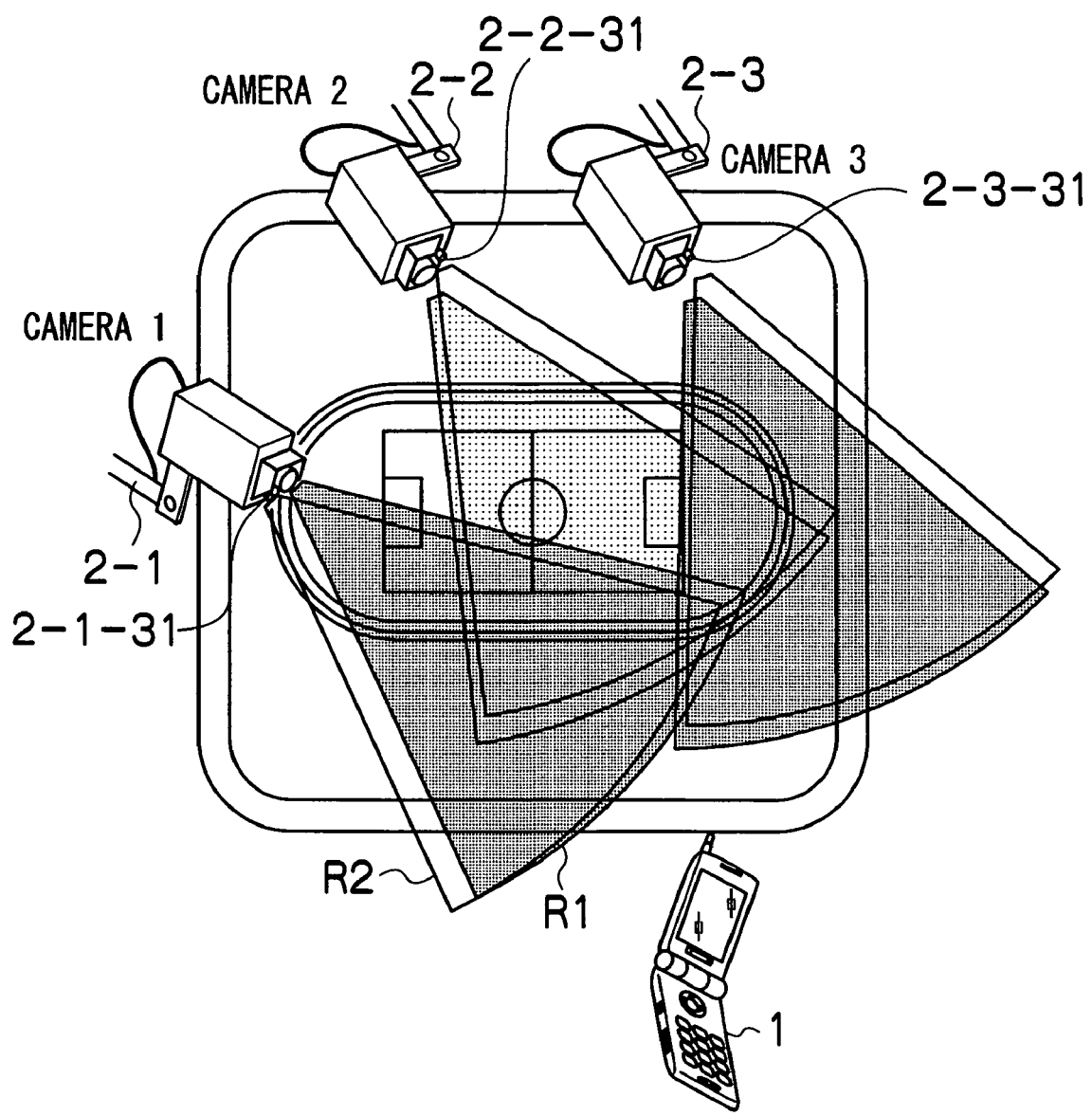
FIG. 6 is a diagram showing that the image-taking range (angle of field) R1 of a camera and the emission range R2 of an information origination section are almost corresponding to each other.

For example, as shown in FIG. 6, an image-taking range (angle of field) R1 of the camera 2 and an emission range R2 of the information origination section 31 are specified by a hood or the like so that the image-taking range R1 and the emission range R2 are almost corresponding to each other.

Figure 7:
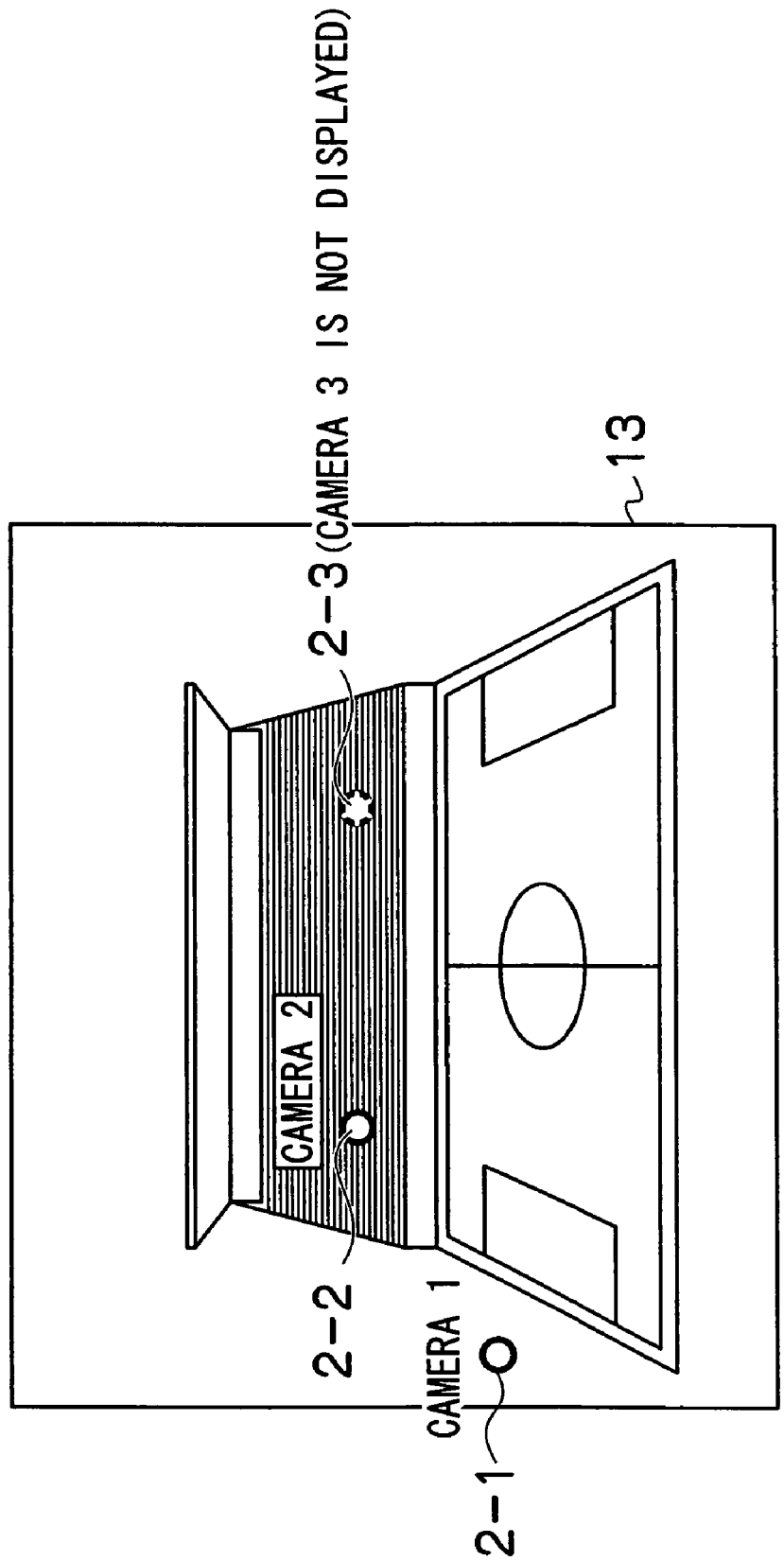
FIG. 7 is a diagram showing that equipment-specific information about a camera which captures a remote control apparatus in the image-taking range is displayed.

Then, as shown in FIG. 7, the equipment-specific information about such cameras 2 as capture the remote control apparatus 1 in the image-taking range is displayed on a screen of the display section 13 in which a still image and equipment-specific information is synthesized. In this figure, as an example, the cameras 2-1 and 2-2 capture the remote control apparatus 1 in their image-taking ranges R1 and emission ranges R2, and the equipment-specific information about the cameras 2-1 and 2-2 is displayed on the display section 13. Though the camera 2-3 is a subject of the camera section 20 of the remote control apparatus 1, the camera 2-3 does not capture the remote control apparatus 1 in its image-taking range R1 and emission range R2. Therefore, the equipment-specific information about the camera 2-3 is not displayed on the display section 13.

Similarly to the first embodiment, when the user selects a desired camera 2 from the equipment-specific information displayed on the display section 13, a picture delivered from the camera 2 is displayed on the display section 13. In FIG. 7, the equipment-specific information about the camera 2-2 is selected as an example, and therefore, a picture from the camera 2-2 is to be displayed on the display section 13. The user can look for the image of himself, watching the display section 13, and thereby he can further enjoy picture watching. The user can also direct remote control of the camera 2-2, such as zooming, panning and tilting, and perform an operation of capturing the image of himself more recognizably, and thereby he can enjoy picture watching more.

Furthermore, if a picture favorably obtained from a desired camera 2 is stored in the memory card 27 as image data, it can be taken home as a souvenir picture, and it is further interesting.

Third Embodiment

A picture from a selected camera 2 is not necessarily to be displayed by the remote control apparatus 1. It may be displayed by other electronic equipment such as a notebook personal computer.

Figure 8:
FIG. 8 is a configuration diagram of main components of a remote control system according to a third embodiment.

FIG. 8 shows the configuration of main components of a remote control system according to a third embodiment. As shown in this figure, a user has a remote control apparatus 1, and it is assumed that he can use various receiving terminals 6 such as a notebook personal computer he carries and a TV apparatus or a head-mount display provided in advance for the seat where he sits.

Figure 9:
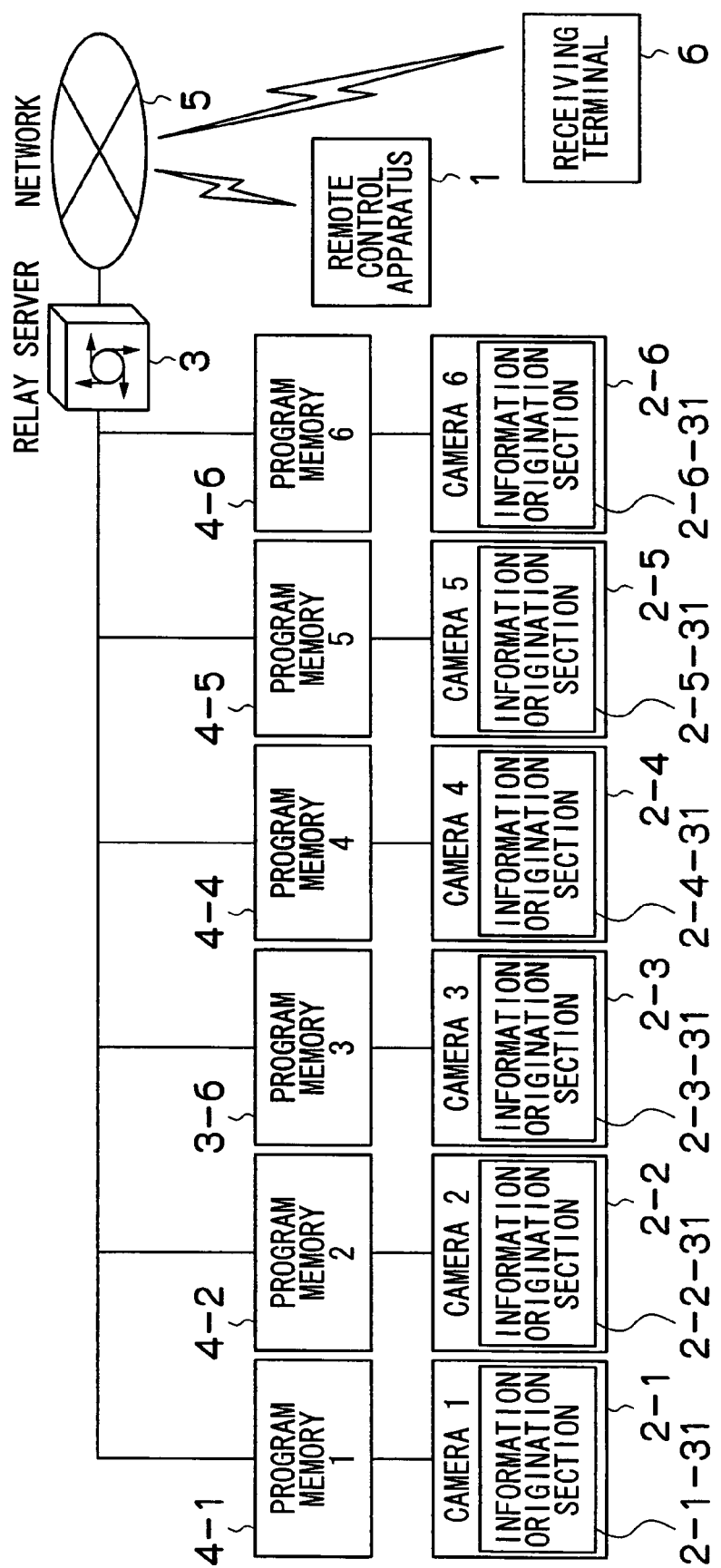
FIG. 9 is a block configuration diagram of the remote control system according to the third embodiment.

FIG. 9 is a block configuration diagram of the remote control system according to the third embodiment. The receiving terminal 6 connects to the relay server 3 via the network 5 separately from the remote control apparatus 1 or with the use of the communication function of the remote control apparatus 1, and receives a picture from a camera 2 relayed by the relay server 3. However, the remote control apparatus 1 may receive the picture from the camera 2.

Figure 10:
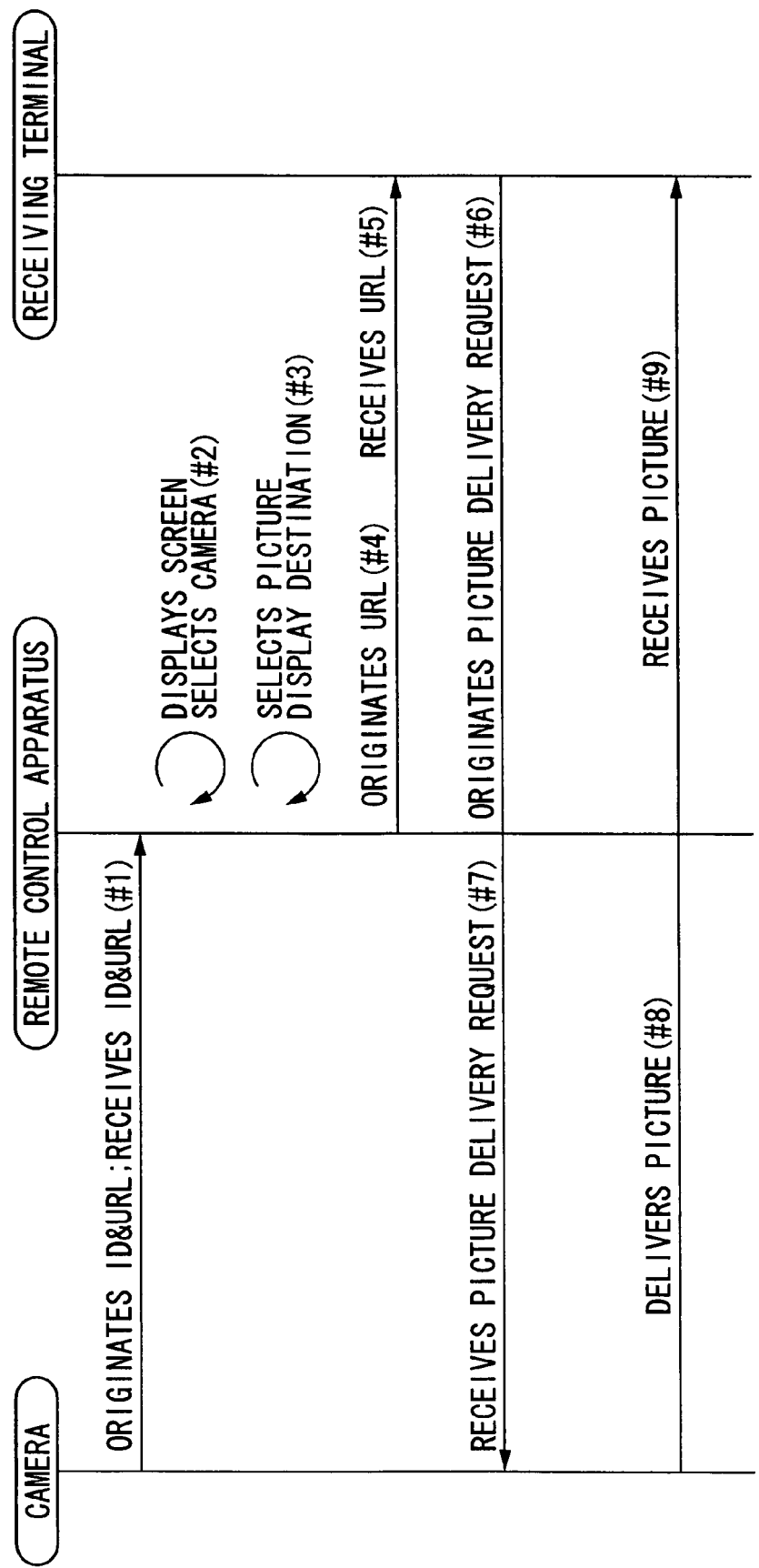
FIG. 10 is a diagram showing the flow of processing to be executed by the remote control system according to the third embodiment.

FIG. 10 shows the flow of processing to be executed by this system.

First, the information origination section 31 of the camera 2 optically originates an ID identifying itself and an URL indicating the source of delivering a picture taken by itself, to the remote control apparatus 1 as equipment-specific information. The remote control apparatus 1 receives the ID and the URL from the camera 2 as an image-taking signal (#1).

Figure 11:
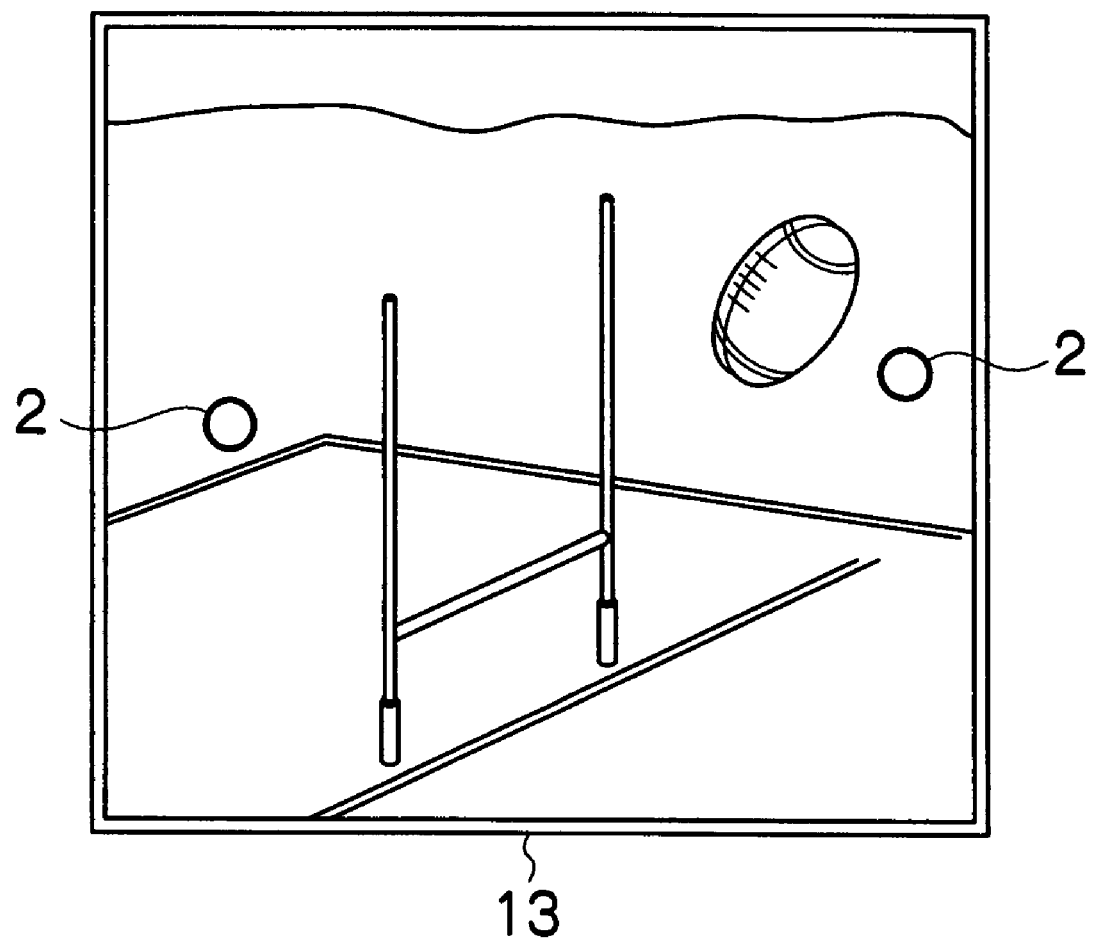
FIG. 11 is a diagram showing an example of a synthesized image displayed on the remote control apparatus.

The remote control apparatus 1 extracts the ID and the URL of each camera 2 from each image-taking signal, synthesizes the IDs with a through image and displays the synthesis (see FIG. 11). Then, a desired camera 2 is selected in accordance with an operation of the operation section 14 (#2). The operations so far are similar to those in the first embodiment.

The remote control apparatus 1 arbitrarily selects a destination of transferring the URL from the selected camera 2, in response to an operation of the operation section 14 (#3). For example, the receiving terminal 6 provided for the seat where the user sits may be specified as the URL transfer destination. If the remote control apparatus 1 itself is specified as the URL transfer destination, the user can enjoy pictures on the remote control apparatus 1 similarly to the first embodiment.

The remote control apparatus 1 transfers the URL received from the selected camera 2 to the selected receiving terminal 6 (#4).

Receiving the URL from the remote control apparatus 1, the receiving terminal 6 accesses the URL and transmits a picture delivery request (#6).

Receiving the picture delivery request from the receiving terminal 6, the camera 2 delivers a picture to the receiving terminal 6 (#7). The receiving terminal 6 receives the picture from the camera 2 and displays it.

Thus, in the case where the display section 13 of the remote control apparatus 1 is too small to watch pictures, it is possible to send pictures to a receiving terminal 6 with a large-sized screen and watch the pictures, and thereby pictures delivered from a desired camera 2 can be appreciated comfortably.

What is claimed is:

1. A picture delivery remote control apparatus comprising:
    an image acquisition section which continuously acquires an image of a picture delivery equipment to be remotely controlled as a subject with an image pickup element;
    an acquisition section which acquires equipment-specific information specific to the picture delivery equipment and information origination position where the equipment-specific information is originated, based on the image continuously acquired by the image acquisition section, the equipment-specific information and the information origination position being optically transmitted from the picture delivery equipment;
    a first display section which superposes the image continuously acquired by the image acquisition section and the equipment-specific information so that the equipment-specific information is displayed near the information origination position;
    an instruction acceptance section which accepts, from a user, selection of equipment-specific information specific to a desired picture delivery equipment to deliver a picture among a plurality of image delivery equipment the equipment-specific information of which has been acquired, and accepts, from the user, a picture delivery request to the desired picture delivery equipment the equipment-specific information of which has been selected;
    a remote control section which transmits the picture delivery request to the desired picture delivery equipment the equipment-specific information of which has been selected via the instruction acceptance section;
    a receiving section which receives a picture delivered from the desired picture delivery equipment in response to the picture delivery request; and
    a second display section which displays the picture received by the receiving section.

2. The picture delivery remote control apparatus according to claim 1, wherein:
    the instruction acceptance section accepts an instruction related to control of the picture delivery equipment, and
    the remote control section transmits a remote control signal corresponding to a content of the instruction accepted by the instruction acceptance section to the desired picture delivery equipment the equipment-specific information of which has been selected via the instruction acceptance section.

3. The picture delivery remote control apparatus according to claim 1, wherein
    the instruction acceptance section accepts designation of any picture delivery destination; and
    the remote control section transmits, to the desired picture delivery equipment the equipment-specific information of which has been selected via the instruction acceptance section, a request to deliver a picture from the desired picture delivery equipment to the picture delivery destination accepted by the instruction acceptance section.

4. The picture delivery remote control apparatus according to claim 1, wherein
    the first display section displays equipment-specific information specific to such picture delivery equipment as almost captures the acquisition section in an image-taking range.

5. The picture delivery remote control apparatus according to claim 1, wherein the first display section displays information specific to such picture delivery equipment as almost captures the acquisition section in the image-taking range.

6. The picture delivery remote control apparatus according to claim 2, wherein the first display section displays information specific to such picture delivery equipment as almost captures the acquisition section in the image-taking range.

7. The picture delivery remote control apparatus according to claim 3, wherein the first display section displays information specific to such picture delivery equipment as almost captures the acquisition section in the image-taking range.

8. The picture delivery remote control apparatus according to claim 4, wherein
a transmission range of the equipment-specific information specific to the image delivery equipment is almost corresponding to the image-taking range of the image delivery equipment.

9. The picture delivery remote control apparatus according to claim 5, wherein the transmission range of the information specific to the image delivery equipment is almost corresponding to the image-taking range of the image delivery equipment.

10. The picture delivery remote control apparatus according to claim 6, wherein the transmission range of the information specific to the image delivery equipment is almost corresponding to the image-taking range of the image delivery equipment.

11. The picture delivery remote control apparatus according to claim 7, wherein the transmission range of the information specific to the image delivery equipment is almost corresponding to the image-taking range of the image delivery equipment.

12. The picture delivery remote control apparatus according to claim 1, further comprising:
a receiving section which receives a picture delivered from the piece of picture delivery equipment in response to the picture delivery request; and
a second display section which displays the picture received by the receiving section.

13. The picture delivery remote control apparatus according to claim 1, further comprising:
a receiving section which receives a picture delivered from the piece of picture delivery equipment in response to the picture delivery request; and
a second display section which displays the picture received by the receiving section.

14. The picture delivery remote control apparatus according to claim 2, further comprising:
a receiving section which receives a picture delivered from the piece of picture delivery equipment in response to the picture delivery request; and
a second display section which displays the picture received by the receiving section.

15. The picture delivery remote control apparatus according to claim 3, further comprising:
a receiving section which receives a picture delivered from the piece of picture delivery equipment in response to the picture delivery request; and
a second display section which displays the picture received by the receiving section.

16. The picture delivery remote control apparatus according to claim 4, further comprising:
a receiving section which receives a picture delivered from the piece of picture delivery equipment in response to the picture delivery request; and
a second display section which displays the picture received by the receiving section.

17. The picture delivery remote control apparatus according to claim 5, further comprising:
a receiving section which receives a picture delivered from the piece of picture delivery equipment in response to the picture delivery request; and
a second display section which displays the picture received by the receiving section.

18. The picture delivery remote control apparatus according to claim 6, further comprising:
a receiving section which receives a picture delivered from the piece of picture delivery equipment in response to the picture delivery request; and
a second display section which displays the picture received by the receiving section.

19. The picture delivery remote control apparatus according to claim 7, further comprising:
a receiving section which receives a picture delivered from the piece of picture delivery equipment in response to the picture delivery request; and
a second display section which displays the picture received by the receiving section.

20. The picture delivery remote control apparatus according to claim 8, further comprising:
a receiving section which receives a picture delivered from the piece of picture delivery equipment in response to the picture delivery request; and
a second display section which displays the picture received by the receiving section.

21. The picture delivery remote control apparatus according to claim 9, further comprising:
a receiving section which receives a picture delivered from the piece of picture delivery equipment in response to the picture delivery request; and
a second display section which displays the picture received by the receiving section.

22. The picture delivery remote control apparatus according to claim 10, further comprising:
a receiving section which receives a picture delivered from the piece of picture delivery equipment in response to the picture delivery request; and
a second display section which displays the picture received by the receiving section.

23. The picture delivery remote control apparatus according to claim 11, further comprising:
a receiving section which receives a picture delivered from the piece of picture delivery equipment in response to the picture delivery request; and
a second display section which displays the picture received by the receiving section.

24. The picture delivery remote control apparatus according to claim 1, wherein
the first display section and the second display section are configured by the same display device.

25. The picture delivery remote control apparatus according to claim 13, wherein the first display section and the second display section are configured by the same display device.

26. The picture delivery remote control apparatus according to claim 14, wherein the first display section and the second display section are configured by the same display device.

27. The picture delivery remote control apparatus according to claim 15, wherein the first display section and the second display section are configured by the same display device.

28. The picture delivery remote control apparatus according to claim 16, wherein the first display section and the second display section are configured by the same display device.

29. The picture delivery remote control apparatus according to claim 17, wherein the first display section and the second display section are configured by the same display device.

30. The picture delivery remote control apparatus according to claim 18, wherein the first display section and the second display section are configured by the same display device.

31. The picture delivery remote control apparatus according to claim 19, wherein the first display section and the second display section are configured by the same display device.

32. The picture delivery remote control apparatus according to claim 20, wherein the first display section and the second display section are configured by the same display device.

33. The picture delivery remote control apparatus according to claim 21, wherein the first display section and the second display section are configured by the same display device.

34. The picture delivery remote control apparatus according to claim 22, wherein the first display section and the second display section are configured by the same display device.

35. The picture delivery remote control apparatus according to claim 23, wherein the first display section and the second display section are configured by the same display device.

36. A picture delivery system, comprising:
a picture delivery equipment which optically transmits equipment-specific information;
an image acquisition section which continuously acquires an image of a picture delivery equipment to be remotely controlled as a subject with an image pickup element;
an acquisition section which acquires the equipment-specific information and information origination position where the equipment-specific information is originated, based on the image continuously acquired by the image acquisition section, the equipment-specific information and the information origination position being optically transmitted from the picture delivery equipment;
a first display section which superposes the image continuously acquired by the image acquisition section and the equipment-specific information so that the equipment-specific information is displayed near the information origination position;
an instruction acceptance section which accepts, from a user, selection of equipment-specific information specific to a desired picture delivery equipment to deliver a picture among a plurality of image delivery equipment the equipment-specific information of which has been acquired, and accepts, from the user, a picture delivery request to the desired picture delivery equipment the equipment-specific information of which has been selected;
a remote control section which transmits the picture delivery request to the desired picture delivery equipment the equipment-specific information of which has been selected via the instruction acceptance section;
a receiving section which receives a picture delivered from the desired picture delivery equipment in response to the picture delivery request; and
a second display section which displays the picture received by the receiving section.

37. A picture delivery method, comprising the steps of:
continuously acquiring an image of a picture delivery equipment to be remotely controlled as a subject with an image pickup element;
acquiring equipment-specific information specific to the picture delivery equipment and information origination position where the equipment-specific information is originated, based on the image continuously acquired by an image acquisition section, the equipment-specific information and the information origination position being optically transmitted from the picture delivery equipment;
superposing the continuously acquired image and the equipment-specific information so that the equipment-specific information is displayed near the information origination position;
accepting, from a user, selection of equipment-specific information specific to a desired piece of picture delivery equipment to deliver a picture among the image delivery equipment the equipment-specific information of which has been acquired, and accepting, from the user, a picture delivery request to the desired picture delivery equipment the equipment-specific information of which has been selected;
transmitting, to the desired picture delivery equipment the equipment-specific information of which has been selected, the picture delivery request to delivery a picture from the desired picture delivery equipment;
receiving a picture delivered from the desired picture delivery equipment in response to the picture delivery request; and
displaying the received picture.

38. The picture delivery remote control apparatus according to claim 1, wherein the piece of picture delivery equipment the information specific to which has been selected executes only the content of control corresponding to the remote control signal which was received earlier.

39. The picture delivery system according to claim 36, wherein the piece of picture delivery equipment the information specific to which has been selected executes only the content of control corresponding to the remote control signal which was received earlier.

40. The picture delivery method according to claim 37, wherein the piece of picture delivery equipment the information specific to which has been selected executes only the content of control corresponding to the remote control signal which was received earlier.

41. The picture delivery remote control apparatus according to claim 1, wherein the piece of picture delivery equipment the information specific to which has been selected gives preference to control by a user who has sent a control code earlier.

42. The picture delivery system according to claim 36, wherein the piece of picture delivery equipment the information specific to which has been selected gives preference to control by a user who has sent a control code earlier.

43. The picture delivery method according to claim 37, wherein the piece of picture delivery equipment the information specific to which has been selected gives preference to control by a user who has sent a control code earlier.

44. The picture delivery remote control apparatus according to claim 1, wherein specification of a control code to be transmitted to the desired picture delivery equipment is performed by one of operation of input to an operation section of the picture delivery remote control apparatus and input of voice.

45. The picture delivery system according to claim 36, wherein specification of a control code to he transmitted to the desired picture delivery equipment is performed by one of operation of input to an operation section of the picture delivery remote control apparatus and input of voice.

46. The picture delivery method according to claim 37, further comprising specifying a control code to be transmitted to the desired picture delivery equipment by one of operation of input to an operation section of a picture delivery remote control apparatus and input of voice.

47. The picture delivery remote control apparatus according to claim 1, wherein
   a picture signal of each of the plurality of picture delivery equipment is respectively stored for a period of time in a program memory corresponding to each of the plurality of picture delivery equipment, and
   the picture signal stored in the program memory corresponding to the picture delivery equipment specified by the remote control apparatus is delivered to the remote control apparatus in response to the picture delivery request received from the remote control apparatus, such that picture signals that have been obtained during a predetermined period of time in the past by the picture delivery equipment specified by the remote control apparatus can he delivered to the remote control apparatus.

48. The picture delivery system according to claim 36, wherein
   a picture signal of each of the plurality of picture delivery equipment is respectively stored for a period of time in a program memory corresponding to each of the plurality of picture delivery equipment, and
   the picture signal stored in the program memory corresponding to the picture delivery equipment specified by the remote control apparatus is delivered to the remote control apparatus in response to the picture delivery request received from the remote control apparatus, such that picture signals that have been obtained during a predetermined period of time in the past by the picture delivery equipment specified by the remote control apparatus can be delivered to the remote control apparatus.

49. The picture delivery method according to claim 37, further comprising:
   storing for a period of time in a program memory corresponding to each of the plurality of picture delivery equipment a picture signal of each of the plurality of picture delivery equipment, respectively, and
   delivering the picture signal stored in the program memory corresponding to the specified picture delivery equipment in response to the received picture delivery request, such that picture signals obtained by the picture delivery equipment during a predetermined period of time in the past are delivered.

\* \* \* \* \*